(12) United States Patent
Liu et al.

(10) Patent No.: US 10,819,990 B2
(45) Date of Patent: Oct. 27, 2020

(54) METHOD AND APPARATUS FOR PALETTE PREDICTOR INITIALIZATION FOR PALETTE CODING IN VIDEO AND IMAGE COMPRESSION

(71) Applicant: HFI Innovation Inc., Zhubei, Hsinchu County (TW)

(72) Inventors: Shan Liu, San Jose, CA (US); Jing Ye, San Jose, CA (US); Tzu-Der Chuang, Zhubei (TW)

(73) Assignee: HFI Innovation Inc., Zhubei, Hsinchu County (TW)

(*) Notice: Subject to any disclaimer, the term of this patent is extended or adjusted under 35 U.S.C. 154(b) by 17 days.

(21) Appl. No.: 15/549,478

(22) PCT Filed: Feb. 15, 2016

(86) PCT No.: PCT/CN2016/073776
§ 371 (c)(1),
(2) Date: Aug. 8, 2017

(87) PCT Pub. No.: WO2016/131408
PCT Pub. Date: Aug. 25, 2016

(65) Prior Publication Data
US 2018/0027246 A1    Jan. 25, 2018

Related U.S. Application Data

(60) Provisional application No. 62/181,414, filed on Jun. 18, 2015, provisional application No. 62/173,026,
(Continued)

(51) Int. Cl.
H04N 19/19    (2014.01)
H04N 19/18    (2014.01)
(Continued)

(52) U.S. Cl.
CPC ......... *H04N 19/197* (2014.11); *H04N 19/119* (2014.11); *H04N 19/159* (2014.11);
(Continued)

(58) Field of Classification Search
None
See application file for complete search history.

(56) References Cited

U.S. PATENT DOCUMENTS

2014/0072239 A1    3/2014  Alakuijala
2014/0301475 A1*  10/2014  Guo ..................... H04N 19/50
                                                      375/240.24
2015/0016501 A1    1/2015  Guo et al.

FOREIGN PATENT DOCUMENTS

CN    102523367 A       6/2012
EP    1 445 734 A1      8/2004
(Continued)

OTHER PUBLICATIONS

International Search Report dated May 18, 2016, issued in application No. PCT/CN2016/073776.
(Continued)

*Primary Examiner* — Mikhail Itskovich
(74) *Attorney, Agent, or Firm* — Oblon, McClelland, Maier & Neustadt, L.L.P.

(57) ABSTRACT

A method and apparatus of palette predictor initialization for a coding system using palette coding are disclosed. A SPS predictor flag indicating whether SPS palette predictor values are present in a current SPS and a PPS predictor flag indicating whether SPS palette predictor values are present in a current PPS are used. According to the values of the SPS predictor flag and the PPS predictor flag, the current palette predictor array having a current predictor size for blocks in a picture corresponding to the current PPS is signaled at an encoder side or derived at a decoder side based on the PPS
(Continued)

palette predictor values, the SPS palette predictor values or both.

16 Claims, 2 Drawing Sheets

Related U.S. Application Data filed on Jun. 9, 2015, provisional application No. 62/126,986, filed on Mar. 2, 2015, provisional application No. 62/116,704, filed on Feb. 16, 2015.

(51) Int. Cl.
| | | |
|---|---|---|
| *H04N 19/17* | (2014.01) | |
| *H04N 19/196* | (2014.01) | |
| *H04N 19/593* | (2014.01) | |
| *H04N 19/70* | (2014.01) | |
| *H04N 19/463* | (2014.01) | |
| *H04N 19/119* | (2014.01) | |
| *H04N 19/159* | (2014.01) | |
| *H04N 19/176* | (2014.01) | |
| *H04N 19/186* | (2014.01) | |

(52) U.S. Cl.
CPC ......... *H04N 19/176* (2014.11); *H04N 19/186* (2014.11); *H04N 19/463* (2014.11); *H04N 19/593* (2014.11); *H04N 19/70* (2014.11)

(56) References Cited

FOREIGN PATENT DOCUMENTS

| WO | WO 2014/165784 A1 | 10/2014 |
| WO | 2016/120468 A1 | 8/2016 |

OTHER PUBLICATIONS

Gisquet, C., et al.; "Non-CE1 On palette prediction for slices;" Joint Collaborative Team on Video Coding (JCT-VC) of ITU-T SG 16 WP 3 and ISO/IEC JTC 1/SC 29/WG 11; Feb. 2015; pp. 1-6.

Joshi, R., et al.; "Proposed editorial improvements to HEVC Screen Context Coding Draft Text 2;" Joint Collaborative Team on Video Coding (JCT-VC) of ITU-T SG 16 WP 3 and ISO/IEC JTC 1/SC 29/WG 11; Feb. 2015; pp. 1-366.

Ye, J., et al.; "On palette predictor initialization for Screen Content Coding;" Joint Collaborative Team on Video Coding (JCT-VC) of ITU-T SG 16 WP 3 and ISO/IEC JTC 1/SC 29/WG 11; Jun. 2015; pp. 1-10.

Guo, et al.: "Evaluation of Palette Mode Coding on HM-12.0+RExt-4.1"; (published on Oct. 9, 2014); pp. 1-8.

Guo, et al.: "Results of Test 3.1 on Palette Mode for Screen Content Coding"; (published on Oct. 9, 2014); pp. 1-7.

Combined Chinese Office Action and Search Report dated Sep. 25, 2019 in Chinese Patent Application No. 201680011356.2 (with English Translation of Category of Cited Documents), 9 pages.

\* cited by examiner

METHOD AND APPARATUS FOR PALETTE PREDICTOR INITIALIZATION FOR PALETTE CODING IN VIDEO AND IMAGE COMPRESSION

CROSS REFERENCE TO RELATED APPLICATIONS

The present invention claims priority to U.S. Provisional Patent Application Ser. No. 62/116,704, filed on Feb. 16, 2015, U.S. Provisional Patent Application Ser. No. 62/126,986, filed on Mar. 2, 2015, GI U.S. Provisional Patent Application Ser. No. 62/173,026, filed on Jun. 9, 2015, and U.S. Provisional Patent Application Ser. No. 62/181,414, filed on Jun. 18, 2015. The U.S. Provisional patent applications are hereby incorporated by reference in their entireties.

FIELD OF THE INVENTION

The present invention relates to palette coding for video data. In particular, the present invention relates to palette predictor initialization for palette coding in video and image compression.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include screen content coding (SCC). Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials. Related key color index coding techniques are briefly reviewed as follows.

Palette Coding

During the development of HEVC range extensions (RExt), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247) and JCTVC-O0218 (Guo et al., "*Evaluation of Palette Mode Coding on HM*-12. *O+RExt-4.1*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-N0247 and JCTVC-O0218, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table (also called palette table) size is first transmitted followed by the palette elements (i.e., color values).
2. Transmission of pixel values: the pixels in the CU are encoded in a raster scan order. For each group of one or more pixels, a flag for a run-based mode is first transmitted to indicate whether the "copy index mode" or "copy above mode" is being used.
   2.1 "Copy index mode": In the copy index mode, a palette index is first signaled followed by "palette_run" (e.g., M) representing the run value. The term palette_run may also be referred as pixel_run in this disclosure. The run value indicates that a total of M samples are all coded using copy index mode. No further information needs to be transmitted for the current position and the following M positions since they have the same palette index as that signaled in the bitstream. The palette index (e.g., i) may also be shared by all three color components, which means that the reconstructed pixel values are (Y, U, V)= (palette$_Y$[i], palette$_U$[i], palette$_V$[i]) for the case of YUV color space.
   2.2 "Copy above mode": In the copy above mode, a value "copy_run" (e.g. N) is transmitted to indicate that for the following N positions (including the current one), the palette index is the same as the corresponding palette index in the row above.
3. Transmission of residue: the palette indices transmitted in Stage 2 are converted back to pixel values and used as the prediction. Residue information is transmitted using HEVC residual coding and is added to the prediction for the reconstruction.

Both "copy index mode" and "copy above mode" are referred as copy modes for palette index coding in this disclosure. Besides, the palette mode is also referred to as palette coding mode in the following descriptions.

In JCTVC-N0247, palette of each component are constructed and transmitted. The palette can be predicted (shared) from its left neighboring CU to reduce the bitrate. In JCTVC-O0218, each element in the palette is a triplet, which represents a specific combination of the three color components. Furthermore, the predictive coding of palette across CU is removed.

Major-Color-Based (or Palette) Coding

Another palette coding technique similar to JCTVC-O0218 has also been disclosed. Instead of predicting the entire palette table from the left CU, individual palette color entry in a palette is predicted from the exact corresponding palette color entry in the above CU or left CU.

For transmission of pixel palette index values, a predictive coding method is applied on the indices as disclosed in JCTVC-O0182 (Guo et al., "*AHG8: Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). Three types of line modes, i.e., horizontal mode, vertical mode and normal mode are used for coding each index line. In the horizontal mode, all the indices in the same line have the same value. If the value is the same as the first pixel of the above pixel line, only line mode signaling bits are transmitted. Otherwise, the index value is also transmitted. In the vertical mode, it indicates that the current index line is the same with the above index line. Therefore, only line mode signaling bits are transmitted. In normal mode, indices in a line are predicted individually. For each index position, the left or above neighbors is used as a predictor, and the prediction symbol is transmitted to the decoder.

Furthermore, pixels are classified into major color pixels (with palette indices pointing to the palette colors) and escape pixel according to JCTVC-O0182. For major color pixels, the pixel value is reconstructed according to the major color index (i.e., palette index) and palette table in the decoder side. For escape pixel, the pixel value is further signaled in the bitstream.

Palette Table Signaling

In the reference software of screen content coding (SCC) standard, SCM-2.0 (Joshi et al., Screen content coding test model 2 (SCM 2), Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R1014), an improved palette scheme is integrated in JCTVC-R0348 (Onno, et al., Suggested combined software and text for run-based palette mode, Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R0348). The palette table of previous palette-coded CU is used as a predictor for current palette table coding. In palette table coding, the current palette table is signaled by choosing which palette colors in the previous coded palette table (palette predictor) are reused, or by transmitting new palette colors. The size of the current palette is set as the size of the predicted palette (i.e., numPredPreviousPalette) plus the size of the transmitted palette (i.e., num_signaled_palette_entries). The predicted palette is a palette derived from the previously reconstructed palette coded CUs. When coding the current CU as a palette mode, those palette colors that are not predicted using the predicted palette are directly transmitted in the bitstream (i.e., signaled entries).

An example of palette updating is shown as follows. In this example, the current CU is coded as palette mode with a palette size equal to six. Three of the six major colors are predicted from the palette predictor (numPredPreviousPalette=3) and three are directly transmitted through the bitstream. The transmitted three colors can be signaled using the exemplary syntax shown below.

num_signaled_palette_entries=3
for(cIdx=0; cIdx<3; cIdx++)//signal colors for different components
    for(i=0; i<num_signaled_palette_entries; i++)
        palette_entries[cIdx][numPredPreviousPalette+i]

Since the palette size is six in this example, the palette indices from 0 to 5 are used to indicate the major color entries in the palette color table. The 3 predicted palette colors are represented with indices 0 to 2. Accordingly, three new palette entries are transmitted for indexes 3 through 5.

In SCM-2.0, if the wavefront parallel processing (WPP) is not applied, the palette predictor table is initialized (reset) at the beginning of each slice or at the beginning of each tile. If the WPP is applied, the last coded palette table is not only initialized (reset) at the beginning of each slice or at the beginning of each tile, but also initialized (reset) at the beginning of each CTU row.

Palette Index Map Coding in SCM-4.0

In the palette mode coding according to SCM-4.0 (Rosewarne et al., *High Efficiency Video Coding (HEVC) Test Model 16 (HM 16) Improved encoder description Update 2*, JCTVC-T1002, ITU-T SG16 WP3 and ISO/IEC JTC1/SC29/WG11, 20th Meeting: Geneva, CH, February 2015, Document: JCTVC-T1002), the palette indices are grouped and coded in front (i.e., before palette_run_mode and palette_run coding), and the escape pixels are coded at the end. The palette_run_mode and palette_run are coded between palette indices and escape pixels.

Palette Predictor Initialization

In SCM-4.0 a global palette predictor set is signaled in PPS. Instead of resetting the palette prediction state, which includes PredictorPaletteSize, PreviousPaletteSize and PredictorPaletteEntries, to all 0, values obtained from the PPS are instead used.

Palette Syntax

For a run of indices in the index map, there are several elements that need to be signaled, including:

1) Run type: either it is a copy above run or a copy index run.
2) Palette index: in a copy index run, it is used to signal what index is used for this run.
3) Run length: the length of this run for both copy above and copy index type.
4) Escape pixel: if there N (N>=1) escape pixels in the run, the N pixel values need to be signaled for these N escape pixels.

In JCTVC-T0065 (Karczewicz, et al., *Non CE1: Grouping Palette Indices At Front*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0065), a syntax signaling is disclosed, where all the palette indices are grouped together. The number of palette indices is signaled first, following by the palette indices.

The coding of palette index run type and run length in the HEVC Screen Content Coding specification (Joshi, et al., *High Efficiency Video Coding (HEVC) Screen Content Coding: Draft 2*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S1005) is as follows:

TABLE 1

| | |
|---|---|
| if( indexMax > 0 && scanPos > = nCbS &&<br>  palette_run_type_flag[ xcPrev ][ ycPrev ]<br>  ! = COPY_ABOVE_MODE ) {<br>  palette_run_type_flag[ xC ][ yC ]<br>} | Note<br><br><br>(1-1) |
| if( palette_run type_flag[ xC ][ yC ] = = COPY_INDEX_MODE<br>&&<br>  adjustedIndexMax > 0)<br>  palette_index_idc | <br><br><br>(1-2) |
| if( indexMax > 0) {<br>  maxPaletteRun = nCbS * nCbS - scanPos - 1<br>  if( maxPaletteRun > 0) {<br>    palette_run_msb_id_plus1<br>    if( palette_run_msb_id_plus1 > 1)<br>      palette_run_refinement_bits<br>  }<br>} | <br><br><br>(1-3)<br><br>(1-4) |

As shown in Table 1, syntax elements for the palette run type (i.e., palette_run_type_flag[xC][yC]) and palette index (i.e., palette_index_idc) are incorporated for each occurrence as indicated by Notes (1-1) and (1-2). Two syntax elements palette_run_msb_id_plus1 and palette_run_refinement_bits are used to signal the run length corresponding to a MSB (most significant bit) part and refinement part respectively as indicated by Notes (1-3) and (1-4) in Table 1.

Palette Mode Coding

Palette coding mode was included into HEVC Screen Content Coding as disclosed in JCTVC-R1005 (Joshi, et al., *High Efficiency Video Coding (HEVC) Screen Content Coding: Draft 1*, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R1005). According to palette mode coding, a palette is utilized to represent a given video block (e.g. CU) with limited number of values. Some related terms are illustrated as follows.

Palette table: Mapping table of pixel value to index.

Color index map: Mapped pixel values to indices in the current block.

Palette predictor: Previous palette table used to predict or substitute the palette of current block.

The decoding and parsing process according to JCTVC-R1005 are briefly described as follows.

1. Signaling of the palette:
  1.1 Signal 'palette sharing flag' first which indicates palette predictor is used as the current palette. If it is true, the following process in step 1.2 to 1.4 are skipped.
  1.2 Signal 'reused flag's indicate which elements of palette predictor are used in current palette.
  1.3 Signal 'number of non-predicted elements' which indicate how many elements in current palette are not predicted from palette predictor.
  1.4 Signal value of each non-predicted element.
2. Signaling of the color index map:
  2.1 The pixels in the block can be coded in horizontally raster scan order, vertically raster order, horizontally traverse scan order and vertically traverse order.
  2.2 For each position, a flag is first transmitted to indicate which prediction mode between 'copy above mode' and 'new run mode' is being used.
  2.3 When 'copy above mode' is used, 'number of runs' follows the flag. For the number of runs the indices are same as those in above line along the scan order
  2.4 When 'new run mode' is used, 'index' is signaled after the flag.
    2.4.1 When the 'index' is 'ESCAPE', the pixel value itself is signaled.
    2.4.2 When the 'index' is in the palette table, 'number of runs' is signaled. For the number of runs the indices are same as the index signaled.

In JCTVC-T0048 (Gisquet, et al., *Non-CE1: On palette prediction for slices*), Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0048), a method of palette predictor initialization is disclosed, which allows initializing the palette prediction at a slice start. Instead of resetting the palette prediction state, which includes PredictorPaletteSize, PreviousPaletteSize and PredictorPaletteEntries, to all 0, values obtained from the PPS are instead used. The PPS_SCC_Extension syntax is shown in Table2.

TABLE 2

| pps_scc_extensions( ) { | Note |
|---|---|
| ... | |
| palette_predictor_initializer_present_flag | (2-1) |
| if( palette_predictor_initializer_present_flag ) { | (2-2) |

TABLE 2-continued

| pps_scc_extensions( ) { | Note |
|---|---|
| luma_bit_depth_entry_minus8 | (2-3) |
| chroma_bit_depth_entry_minus8 | |
| num_palette_predictor_initializer_minus1 | |
| for( i = 0; i <= num_palette_predictor_initializer_minus1; i++ ) | |
| for( comp = 0; comp < 3; comp++ ) | |
| palette_predictor_initializers[ i ][ comp ] | |
| } | (2-4) |
| } | |

As shown in Table 2, syntax element palette_predictor_initializer_present_flag is signaled as indicated by Note (2-1) to indicate whether palette predictor initializer exists in the PPS level. If the flag is equal to 1 as indicated by Note (2-2), values of the palette predictor initializer are signaled as indicated from Note (2-3) through Note (2-4).

To generate the initializer, a pre-pass is performed on a subset of blocks to generate the palette predictor using the normal palette encoder module.

In the current HEVC SCC palette mode specification based on JCTVC-T1005 (Joshi, et al., *HEVC Screen Content Coding Draft Text 3*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1005), several syntax elements related to palette predictor are defined as follows:

palette_max_size specifies the maximum allowed palette size. When not present, the value of palette_max_size is inferred to be 0.

delta_palette_max_predictor_size specifies the difference between the maximum allowed palette predictor size and the maximum allowed palette size. When not present, the value of delta_palette_max_predictor_size is inferred to be 0. The variable PaletteMaxPredictorSize is derived as follows:

PaletteMaxPredictorSize=palette_max_size+delta_palette_max_predictor_size.

It is desirable to improve the coding efficiency and/or syntax parsing throughput rate associated with palette index map coding.

BRIEF SUMMARY OF THE INVENTION

A method and apparatus of palette predictor initialization for a coding system using palette coding are disclosed. In one embodiment, a SPS (sequence parameter set) predictor flag indicating whether SPS palette predictor values are present in a current SPS and a PPS (picture parameter set) predictor flag indicating whether SPS palette predictor values are present in a current PPS are used. If the SPS predictor flag indicates that the SPS palette predictor values are present in the current SPS (e.g., the SPS predictor flag is 1), a first-total-predictor-number and the first-total-predictor-number of the SPS palette predictor values are signaled in the current SPS of the video bitstream at an encoder side or parsed from the current SPS of the video bitstream at a decoder side. If the PPS predictor flag indicates that the PPS palette predictor values are present in the current PPS (e.g., the PPS predictor flag is 1), a second-total-predictor-number and the second-total-predictor-number of the PPS palette predictor values are signaled in the current PPS of the video bitstream at an encoder side or parsed from the current PPS of the video bitstream at a decoder side. The current palette predictor array having a current predictor size for blocks in a picture corresponding to the current PPS is signaled at an encoder side or derived at a decoder side based on the PPS palette predictor values, the SPS palette predictor values or both.

In one embodiment, if the PPS predictor flag is 1, the current predictor size is set to the second-total-predictor-number and entries of the current palette predictor array are copied from the PPS palette predictor values. If the PPS predictor flag is 0 and the SPS predictor flag is 1, the current predictor size is set to the first-total-predictor-number and entries of the current palette predictor array are copied from the SPS palette predictor values. If both the PPS predictor flag and the SPS predictor flag are 0, the current predictor size is set to 0 and entries of the current palette predictor array are set to a default value, such as 0 or half of a maximum pixel value.

The PPS predictor flag and the SPS predictor flag can be signaled at an encoder side or parsed at a decoder side. If the PPS predictor flag or the SPS predictor flag is not present in the video bitstream, the respective PPS predictor flag or SPS predictor flag is inferred to be 0.

In another embodiment, an additional slice predictor flag or an additional tile flag in a corresponding slice or tile can be signaled or parsed. The slice or tile predictor flag indicates whether respective slice or tile palette predictor values are present in a current slice or tile are present. If the slice or tile predictor flag is 1, a third-total-predictor-number and the third-total-predictor-number of the slice or tile palette predictor values in the current slice or tile are signaled in the current slice or tile of the video bitstream at an encoder side or parsed from the current slice or tile of the video bitstream at a decoder side. In this case, the current predictor size is set to the third-total-predictor-number and entries of the current palette predictor array are copied from the slice or tile palette predictor values instead of the PPS palette predictor values or the SPS palette predictor values. If the slice or tile predictor flag is 1, the current predictor size is set to the second-total-predictor-number and entries of the current palette predictor array are copied from the PPS palette predictor values, or the current predictor size is set to the first-total-predictor-number and the entries of the current palette predictor array are copied from the SPS palette predictor values.

In another embodiment, the first-total-predictor-number associated with the SPS palette predictor values and the second-total-predictor-number associated with the PPS palette predictor values are always the same per conformance requirement.

In yet another embodiment, the first-total-predictor-number associated with the SPS palette predictor values is different from the second-total-predictor-number associated with the PPS palette predictor values. In the case that the first-total-predictor-number associated with the SPS palette predictor values is smaller than the second-total-predictor-number associated with the PPS palette predictor values, if the PPS predictor flag is 1, the current predictor size is set to the second-total-predictor-number and entries of the current palette predictor array are copied from the PPS palette predictor values. If the PPS predictor flag is 0 and the SPS predictor flag is 1, the current predictor size is set to the first-total-predictor-number and entries of the current palette predictor array are copied from the SPS palette predictor values. If the PPS predictor flag is 0 and the SPS predictor flag is also 0, the current predictor size is set to 0 and entries of the current palette predictor array are set to 0 or another default value.

In the case that the first-total-predictor-number associated with the SPS palette predictor values is greater than the second-total-predictor-number associated with the PPS palette predictor values, if the PPS predictor flag is 1, the current predictor size is set to the second-total-predictor-number and entries of the current palette predictor array are copied from the PPS palette predictor values. If the PPS predictor flag is 1 and the SPS predictor flag is also 1, the current predictor size is set to the first-total-predictor-number. The beginning second-total-predictor-number entries of the current palette predictor array are copied from the PPS palette predictor values, and remaining (N−M) entries of the current palette predictor array are copied from the SPS palette predictor values, where N represents the first-total-predictor-number and M represents the second-total-predictor-number. The remaining (N−M) entries of the current palette predictor array can be copied from beginning (N−M) values of the SPS palette predictor values. Alternatively, the remaining (N−M) entries of the current palette predictor array can be copied from last (N−M) values of the SPS palette predictor values.

According to another embodiment for the case that the first-total-predictor-number associated with the SPS palette predictor values is greater than the second-total-predictor-number associated with the PPS palette predictor values, if the PPS predictor flag is 1 and the SPS predictor flag is also 1, the current predictor size is set to the first-total-predictor-number. The beginning (N−M) entries of the current palette predictor array are copied from the SPS palette predictor values. The remaining second-total-predictor-number entries of the current palette predictor array are copied from the PPS palette predictor values. The beginning (N−M) entries of the current palette predictor array can be copied from the beginning (N−M) values or the last (N−M) values of the SPS palette predictor values.

In yet another embodiment, the PPS predictor flag is 1 and the SPS predictor flag is 1, the current predictor size is set to a sum of the first-total-predictor-number associated with the SPS palette predictor values and the second-total-predictor-number associated with the PPS palette predictor values. The beginning second-total-predictor-number entries of the current palette predictor array are copied from the PPS palette predictor values and the first-total-predictor-number of remaining entries of the current palette predictor array are copied from the SPS palette predictor values. Alternatively, the beginning first-total-predictor-number entries of the current palette predictor array can be copied from the SPS palette predictor values, and the remaining second-total-predictor-number entries of the current palette predictor array can be copied from the PPS palette predictor values. If the sum of the first-total-predictor-number and the second-total-predictor-number is greater than a maximum allowed palette predictor size, the current predictor size is set to the maximum allowed palette predictor size.

In yet another embodiment, a latest palette from a previous slice or a previous picture is used as a global palette predictor for the current palette. Compared to a conventional approach, the embodiment provides the advantage of low delay processing.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Palette Initialization for Predictive Palette Coding

In SCM-4.0 a global palette predictor set is signaled in Picture Parameter Set (PPS). Instead of resetting the palette prediction state to 0, palette predictors derived from the PPS are used instead. The palette predictor information may include PredictorPaletteSize, PreviousPaletteSize and PredictorPaletteEntries.

In this invention, a method for palette initialization is disclosed, where the global palette predictors are derived from previous coded slices or pictures, instead of from the current slice or current picture. For example, when encoding or decoding a slice or a picture, a set of global palette predictors are generated by a certain method, such as the most frequent used palettes or based on the statistic of previous coded slices or pictures, or the palettes in the last palette predictor table.

In one embodiment, a flag in picture level syntax such as PPS (picture parameter set) can be signaled to use the derived palette predictors or signaling new palette predictors.

In another embodiment, the system may always use the derived palette predictors in PPS as the global palette predictor.

In the existing HEVC SCC development, the palette predictor is initialized at the beginning of each slice. A set of palette predictors is signaled at the PPS level so the first palette coded CU in each slice can use the palette initial predictor. In addition, a set of palette predictors are signaled at SPS (sequence parameter set) level so that when the palette predictor at PPS level is not signaled (or not used), the initial palette predictors at the SPS level can be used.

Palette Predictor Initialization for Monochrome Format

For monochrome content, it is not necessary to initialize chroma values of the palette predictor. Accordingly, in one embodiment of the present invention, only the luma values of the palette predictor for the monochrome content are initialized at the slice start or tile start. The initial values and related flags can be obtained from PPS. One exemplary pps_scc_extension( ) syntax table is shown in Table 3, where syntax element palette_predictor_initializer_present_flag is signaled to indicate whether palette predictor initializer exists in the PPS SCC extension as indicated by Note (3-1). If it is equal to 1 as indicated by Note (3-2), values of palette predictor initializer are signaled as indicated by syntax lines from Note (3-3) through Note (3-4).

TABLE 3

| pps_scc_extensions( ) { | Note |
|---|---|
| ... ... | |
| palette_predictor_initializer_present_flag | (3-1) |
| if( palette_predictor_initializer_present_flag ) { | (3-2) |
|   luma_bit_depth_entry_minus8 | (3-3) |

TABLE 3-continued

| pps_scc_extensions( ) { | Note |
|---|---|
|   chroma_bit_depth_entry_minus8 | |
|   num_palette_predictor_initializer_minus1 | |
|   numComps = ( ChromaArrayType == 0 ) ? 1 : 3 | |
|   for( i = 0; i <= | |
|   num_palette_predictor_initializer_minus1; i++ ) | |
|     for( comp = 0; comp < numComps; comp++ ) | |
|       palette_predictor_initializers[ i ][ comp ] | |
| } | (3-4) |
| } | |

Another exemplary pps_scc_extension( ) syntax table is shown in Table 4, where syntax element palette_predictor_initializer_present_flag is signaled to indicate whether palette predictor initializer exists in the PPS SCC extension as indicated by Note (4-1). If it is equal to 1 as indicated by Note (4-2), values of palette predictor initializer are signaled as indicated by syntax lines from Note (4-3) through Note (4-4).

TABLE 4

| pps_scc_extensions( ) { | Note |
|---|---|
| ... ... | |
| palette_predictor_initializer_present_flag | (4-1) |
| if( palette_predictor_initializer_present_flag ) { | (4-2) |
|   luma_bit_depth_entry_minus8 | (4-3) |
|   chroma_bit_depth_entry_minus8 | |
|   num_palette_predictor_initializer_minus1 | |
|   for( i = 0; i <= | |
|   num_palette_predictor_initializer_minus1; i++ ) | |
|     for( comp = 0; comp < 3; comp++ ) | |
|       if( ( comp == 0 && ChromaArrayType == 0) \|\| | |
|       ChromaArrayType > 0 ) | |
|         palette_predictor_initializers[ i ][ comp ] | |
| } | (4-4) |
| } | |

In yet another example, the luma_bit_depth_entry_minus8, chroma_bit_depth_entry_minus8, num_palette_predictor_initializer_minus1, and palette_predictor_initializers can be signaled at SPS.

Palette Predictor Initialization at Tile Start

According to this method, the palette predictor is signaled at the beginning of each tile. In other words, at the beginning of each tile, a tile level predictor flag (e.g. palette_predictor initializer_present_flag) is signaled to specify whether a set of initial palette predictor values are signaled. If "palette_predictor initializer_present_flag" is equal to 1, a set of predictor values are signaled in a manner similar to the case of palette predictor initialization for monochrome format. Otherwise, the palette predictor is not signaled. In this case, the palette predictor may be initialized with a set of default values. For example, the default values can be set to 0. In another example, the default values can be set to 128. In general, the default values may be set to any valid pixel value.

In one variant, the signaling of palette predictor may occur only at the beginning of an independent tile. The present invention can be applied to both monochrome format and non-monochrome format.

Palette Predictor Initialization at Slice Start

According to this method, the palette predictor is signaled the beginning of each slice. In other words, at the beginning of each slice, a slice level predictor flag (e.g. palette_predictor_initializer_present_flag) is signaled to specify whether a set of initial palette predictor values are signaled.

If "palette_predictor_initializer_present_flag" is equal to 1, a set of predictor values are signaled a set of predictor values are signaled in a manner similar to the case of palette predictor initialization for monochrome format. Otherwise, the palette predictor is not signaled. In this case, the palette predictor may be initialized with a set of default values. For example, the default values can be set to 0. In another example, the default values can be set to 128. The value of 128 is intended for pixels with 8-bit depth, i.e., half of the maximum pixel value. In general, the default values may be set to any valid pixel value.

In one variant, the signaling of palette predictor may occur only at the beginning of an independent slice. The present invention can be applied to both monochrome format and non-monochrome format.

Palette Predictor Initialization in SPS and PPS

According to this method, the palette predictor is signaled in the SPS and PPS. For example, a SPS level predictor flag (e.g. sps_palette_predictor_initializer_present_flag) in sequence parameter set (SPS) is signaled to indicate whether a set of palette predictor values is present in the current SPS.

One exemplary sps_scc_extension( ) syntax table is shown in Table 5, where syntax element sps_palette_predictor_initializer_present_flag is signaled to indicate whether palette predictor initializer exists in the SPS SCC extension syntax table as indicated by Note (5-1). If it is equal to 1 as indicated by Note (5-2), parameters related to the palette predictor initializer and the values of palette predictor initializer are signaled as indicated by syntax lines from Note (5-3) through Note (5-4). The parameters related to the palette predictor initializer include parameters "sps_luma_bit_depth_entry_minus8", "sps_chroma_bit_depth_entry_minus8" and "sps_num_palette_predictor_initializer_minus1". A set of initial palette predictor values are signaled by "sps_palette_predictor_initializers[ ][ ]". While specific syntax elements are used in Table 5, these syntax elements serve as illustration purpose for an embodiment of the present invention and shall not construed as limitations of the present invention.

TABLE 5

| sps_scc_extensions( ) { | Note |
|---|---|
| ... ... | |
| sps_palette_predictor_initializer_present_flag | (5-1) |
| if( sps_palette_predictor_initializer_present_flag ) { | (5-2) |
|   sps_luma_bit_depth_entry_minus8 | (5-3) |
|   sps_chroma_bit_depth_entry_minus8 | |
|   sps_num_palette_predictor_initializer_minus1 | |
|   numComps = ( ChromaArrayType = = 0 ) ? 1 : 3 | |
|   for( i = 0; i <= | |
|   sps_num_palette_predictor_initializer_minus1; i++ ) | |
|     for( comp = 0; comp < numComps; comp++ ) | |
|       sps_palette_predictor_initializers[ i ][ comp ] | |
| } | (5-4) |
| ... ... | |
| } | |

In Table 5, if the flag "sps_palette_predictor_initializer_present_flag" is equal to 0 (i.e., no SPS palette predictor values present in the current SPS), and then the initial palette predictor values for this sequence (referring this SPS) are set to default values. In this case, the palette predictor may be initialized with a set of default values. For example, the default values can be set to 0. In another example, for pixels with 8-bit depth, the default values can be set to 128 (i.e., half of the maximum pixel value). In general, the default values may be set to any valid pixel value.

In JCTVC-S 1005, a syntax element palette_mode_enabled_flag at the SPS level is used to specify whether palette mode is allowed. The syntax element equal to 1 specifies that the palette mode may be used for Intra blocks. The syntax element equal to 0 specifies that the palette mode is not applied. When not present, the value of palette_mode_enabled_flag is inferred to be equal to 0. When the syntax element is equal to 0, the value of sps_palette_predictor_initializer_present_flag shall be equal to 0.

Furthermore, in picture parameter set (PPS), a PPS level predictor flag "pps_palette_predictor_initializer_present_flag" is signaled to specify whether there is a set of palette predictor values signaled for the current picture (referring to this PPS). One exemplary pps_scc_extension( ) syntax table is shown in Table 6, where syntax element pps_palette_predictor_initializer_present_flag is signaled to indicate whether palette predictor initializer exists in the PPS SCC extension as indicated by Note (6-1). If it is equal to 1 as indicated by Note (6-2), parameters related to the palette predictor initializer and the values of palette predictor initializer are signaled as indicated by syntax lines from Note (6-3) through Note (6-4). The parameters related to the palette predictor initializer include parameters "pps_luma_bit_depth_entry_minus8", "pps_chroma_bit_depth_entry_minus8" and "pps_num_palette_predictor_initializer_minus1". The set of initial palette predictor values are signaled by "pps_palette_predictor_initializers[ ][ ]".

TABLE 6

| pps_scc_extensions( ) { | Note |
|---|---|
| ... ... | |
| pps_palette_predictor_initializer_present_flag | (6-1) |
| if(pps_palette_predictor_initializer_present_flag ) { | (6-2) |
|   pps_luma_bit_depth_entry_minus8 | (6-3) |
|   pps_chroma_bit_depth_entry_minus8 | |
|   pps_num_palette_predictor_initializer_minus1 | |
|   numComps = ( ChromaArrayType = = 0 ) ? 1 : 3 | |
|   for( i = 0; i <= | |
|   pps_num_palette_predictor_initializer_minus1; i++ ) | |
|     for( comp = 0; comp < numComps; comp++ ) | |
|       pps_palette_predictor_initializers[ i ][ comp ] | |
| } | (6-4) |
| } | |

The PPS level predictor flag "pps_palette_predictor_initializer_present_flag" equal to 1 indicates that palette predictor parameters are present in the PPS, which are used to modify the palette predictor specified in the active SPS. When the flag is equal to 0, it indicates that the palette predictor parameters used for the pictures referring to the PPS is inferred to be equal to those specified by the active SPS. When palette_mode_enabled_flag is equal to 0, the value of the flag "pps_palette_predictor_initializer_present_flag" shall be equal to 0. When palette_mode_enabled_flag is equal to 1, "sps_palette_predictor_initializer_present_flag" is equal to 0, and "pps_palette_predictor_initializer_present_flag" is equal to 0, the default palette predictor parameters are used.

In another embodiment, the flags "sps_palette_predictor_initializer_present_flag" and "pps_palette_predictor_initializer_present_flag" are only signaled when "palette_mode_enabled_flag" is equal to 1. In other words, only when the palette mode is allowed for the current sequence or picture, these flags will be signaled. If the palette mode is disabled (i.e., "palette_mode_enabled_flag"

equal to 0), these flags are not signaled. In this case, these flags are inferred to be equal to 0.

The palette predictor parameters at the beginning of each slice refer to the palette predictor parameters specified in the active PPS. If both "sps_palette_predictor_initializer_present_flag" in the active SPS and "pps_palette_predictor_initializer_present_flag" in the active PPS are equal to 0, the default palette predictor parameters are used for the current slice at the beginning.

The palette predictor parameters and predictor values at the beginning of each tile refer to the palette predictor parameters specified in the active PPS. If both "sps_palette_predictor_initializer_present_flag" specified in the active SPS and "pps_palette_predictor_initializer_present_flag" specified in the active PPS are equal to 0, the default palette predictor parameters and predictor values are used for the current tile at the beginning.

In another example, the PPS level predictor parameters, such as "pps_luma_bit_depth_entry_minus8", "pps_chroma_bit_depth_entry_minus8" and "pps_num_palette_predictor_initializer_minus1", or part of them, may not be signaled in PPS. When not signaled, they are inferred from corresponding SPS parameters. In this case, the value of "pps_luma_bit_depth_entry_minus8" is inferred to be equal to "sps_luma_bit_depth_entry_minus8"; the value of "pps_chroma_bit_depth_entry_minus8" is inferred to be equal to "sps_chroma_bit_depth_entry_minus8"; and the value of "pps_num_palette_predictor_initializer_minus1" is inferred to be equal to "sps_num_palette_predictor_initializer_minus1".

One exemplary pps_scc_extension( ) syntax table is shown in Table 7, where syntax element pps_palette_predictor_initializer_present_flag is signaled to indicate whether palette predictor initializer exists in the PPS SCC extension as indicated by Note (7-1). If it is equal to 1 as indicated by Note (7-2), parameters related to the palette predictor initializer and the values of palette predictor initializer are signaled as indicated by syntax lines from Note (7-3) through Note (7-4). As shown in Table 7, PPS level predictor parameters "pps_luma_bit_depth_entry_minus8", "pps_chroma_bit_depth_entry_minus8" and "pps_num_palette_predictor_initializer_minus1 are not signaled is PPS.

TABLE 7

| pps_scc_extensions( ) { | Note |
|---|---|
| ... ... | |
| pps_palette_predictor_initializer_present_flag | (7-1) |
| if(pps_palette_predictor_initializer_present_flag ) { | (7-2) |
| numComps = ( ChromaArrayType = = 0 ) ? 1 : 3 | (7-3) |
| for( i = 0; i <= | |
| pps_num_palette_predictor_initializer_minus1; i++ ) | |
| for( comp = 0; comp < numComps; comp++ ) | |
| pps_palette_predictor_initializers[ i ][ comp ] | |
| } | (7-4) |
| } | |

In another embodiment, a SPS predictor flag, (e.g. sps_palette_predictor_initializer_present_flag) is signaled in sequence parameter set (SPS). This SPS predictor flag specifies whether there is a set of signaled palette predictor values for the current sequence (referring to this SPS).

One exemplary sps_scc_extensions( ) syntax table is shown in Table 8, where syntax element palette_mode_enabled_flag is signaled as indicated by Note (8-1). Syntax element sps_palette_predictor_initializer_present_flag is signaled as indicated by Note (8-3) if palette_mode_enabled_flag is equal to 1 as indicated by Note (8-2). If sps_palette_predictor_initializer_present_flag is equal to 1 as indicated by Note (8-4), the syntax related to the total number of the SPS palette predictor values (i.e., sps_num_palette_predictor initializer_minus1) and the values of palette predictor initializer are signaled as indicated by syntax lines from Note (8-5) through Note (8-6).

TABLE 8

| sps_scc_extensions( ) { | Note |
|---|---|
| ... ... | |
| palette_mode_enabled_flag | (8-1) |
| if( palette_mode_enabled_flag ) { | (8-2) |
| ... ... | |
| sps_palette_predictor_initializer_present_flag | (8-3) |
| if( sps_palette_predictor_initializer_present_flag ) { | (8-4) |
| sps_num_palette_predictor_initializer_minus1 | (8-5) |
| numComps = (chroma_format_idc = = 0 ) ? 1 : 3 | |
| for( i = 0; i <= | |
| sps_num_palette_predictor_initializer_minus1; i++ ) | |
| for( comp = 0; comp < numComps; comp++ ) | |
| sps_palette_predictor_initializers[ i ][ comp ] | |
| } | (8-6) |
| } | |
| ... ... | |
| } | |

A PPS predictor flag "pps_palette_predictor_initializer_present_flag" is signaled in PPS to specify whether there is a set of signaled palette predictor values for the current picture (referring to this PPS). One exemplary pps_scc_extensions( ) syntax table is shown in Table 9, where syntax element pps_palette_predictor_initializer_present_flag is signaled to indicate whether palette predictor initializer exists in the PPS SCC extension as indicated by Note (9-1). If it is equal to 1 as indicated by Note (9-2), the syntax related to the total number of the PPS palette predictor values (i.e., pps_num_palette_predictor_initializer_minus1) and the values of palette predictor initializer are signaled as indicated by syntax lines from Note (9-3) through Note (9-4).

TABLE 9

| pps_scc_extensions( ) { | Note |
|---|---|
| ... ... | |
| pps_palette_predictor_initializer_present_flag | (9-1) |
| if( pps_palette_predictor_initializer_present_flag ) { | (9-2) |
| monochrome_palette_flag | (9-3) |
| luma_bit_depth_entry_minus8 | |
| if( !monochrome_palette_flag ) | |
| chroma_bit_depth_entry_minus8 | |
| pps_num_palette_predictor_initializer_minus1 | |
| numComps = monochrome_palette_flag ? 1 : 3 | |
| for( i = 0; i <= | |
| pps_num_palette_predictor_initializer_minus1; i++ ) | |
| for( comp = 0; comp < numComps; comp++ ) | |
| pps_palette_predictor_initializers[ i ][ comp ] | |
| } | (9-4) |
| } | |

Semantics of Related Syntax in SPS SCC Extensions

Compared to the syntax table for SPS SCC extensions in the existing HEVC SCC draft specification (i.e., JCTVC-S 1005), several new syntax elements are included. The semantics of the related syntax elements are described as follows.

sps_palette_predictor_initializer_present_flag equal to 1 specifies that the sequence palette predictors are initialized using the sps_palette_predictor_initializers specified in Table 8. sps_palette_predictor_initializer_present_flag equal to 0 specifies that the entries in the sequence palette predictor are initialized to 0. When not present, the value of sps_palette_predictor_initializer_present_flag is inferred to be equal to 0.

sps_num_palette_predictor_initializer_minus1 specifies the number of entries in the sequence palette predictor initializer. It is a requirement of bitstream conformance that the value of sps_num_palette_predictor_initializer_minus1 plus one shall be less than or equal to PaletteMaxPredictorSize.

sps_palette_predictor_initializers[i][comp] specifies the value of the comp-th component of the i-th palette entry that is used to initialize the array PredictorPaletteEntries. For values of i in the range of 0 to sps_num_palette_predictor_initializer_minus1, inclusive, the value of the sps_palette_predictor_initializers[i][0] shall be in the range of 0 to (1<<BitDepthY)−1, inclusive, and the values of sps_palette_predictor_initializers[i][1] and sps_palette_predictor_initializers[i][2] shall be in the range of 0 to (1<<BitDepth-C)−1, inclusive.

Semantics of Related Syntax in PPS SCC Extensions

Compared to the syntax table for PPS SCC extensions in the existing HEVC SCC draft specification (i.e., JCTVC-S 1005), several new syntax elements are included. The semantics of the related syntax elements are described as follows.

pps_palette_predictor_initializer_present_flag equal to 1 specifies that the picture palette predictors are initialized using the pps_palette_predictor_initializers specified in Table 9. pps_palette_predictor_initializer_present_flag equal to 0 specifies that the entries in the picture palette predictor referring to the PPS are inferred to be equal to those specified by the active SPS. When not present, the value of pps_palette_predictor_initializer_present_flag is inferred to be equal to 0.

pps_num_palette_predictor_initializer_minus1 specifies the number of entries in the PPS palette predictor initializer.

pps_palette_predictor_initializers[i][comp] specifies the value of the comp-th component of the i-th palette entry that is used to initialize the array PredictorPaletteEntries. For values of i in the range of 0 to pps_num_palette_predictor_initializer_minus1, inclusive, the value of the pps_palette_predictor_initializers[i][0] shall be in the range of 0 to (1<<BitDepthEntryY)−1, inclusive, and the values of pps_palette_predictor_initializers[i][1] and pps_palette_predictor_initializers[i][2] shall be in the range of 0 to (1<<BitDepthEntryC)−1, inclusive.

Initialization Process for Palette Predictor Variables

According to one embodiment, outputs of this process are the initialized palette predictor variables PredictorPaletteSize and PredictorPaletteEntries. The PredictorPaletteSize and PredictorPaletteEntries are derived as follows. For the case that pps_palette_predictor_initializer_present_flag is equal to 1, PredictorPaletteSize is set equal to pps_num_palette_predictor_initializer_minus1 plus 1. The array PredictorPaletteEntries is derived as follows:

for(i=0; i<PredictorPaletteSize; i++)
  for(comp=0; comp<3; comp++)
    PredictorPaletteEntries[i][comp]=pps_palette_predictor_initializers[i][comp]

For the case that pps_palette_predictor_initializer_present_flag is equal to 0, if sps_palette_predictor_initializer_present_flag is equal to 1, PredictorPaletteSize is set equal to sps_num_palette_predictor_initializer_minus1 plus 1. The array PredictorPaletteEntries is derived as follows:

for(i=0; i<PredictorPaletteSize; i++)
  for(comp=0; comp<3; comp++)
    PredictorPaletteEntries[i][comp]= sps_palette_predictor_initializers[i][comp], For the case that pps_palette_predictor_initializer_present_flag is equal to 0, if sps_palette_predictor_initializer_present_flag is equal to 0, PredictorPaletteSize is set equal to 0 and PredictorPaletteEntries is set equal to 0.

According to another embodiment, outputs of this process are the initialized palette predictor variables PredictorPaletteSize and PredictorPaletteEntries. The PredictorPaletteSize is derived as follows.

If sps_palette_predictor_initializer_present_flag is equal to 1, PredictorPaletteSize is set equal to sps_num_palette_predictor_initializer_minus1 plus 1.

Otherwise, PredictorPaletteSize is set equal to 0.

If pps_palette_predictor_initializer_present_flag is equal to 1, PredictorPaletteSize is set equal to pps_num_palette_predictor_initializer_minus1 plus 1.

Otherwise, PredictorPaletteSize is inferred to be equal to PredictorPaletteSize specified by the active SPS.

The array PredictorPaletteEntries is derived as follows:

If sps_palette_predictor_initializer_present_flag is equal to 1 for(i=0; i<PredictorPaletteSize; i++)
  for(comp=0; comp<3; comp++)
    PredictorPaletteEntries[i][comp]=sps_palette_predictor_initializers[i][comp]

Otherwise, PredictorPaletteEntries is set equal to 0.

If pps_palette_predictor_initializer_present_flag is equal to 1, for(i=0; i<PredictorPaletteSize; i++)
  for(comp=0; comp<3; comp++)
    PredictorPaletteEntries[i][comp]=pps_palette_predictor_initializers[i][comp]

Otherwise, PredictorPaletteEntries is inferred to be equal to PredictorPaletteEntries specified by the active SPS.

Variants of the Initialization Process Related to Palette Predictor Variables.

Various ways to initialize the number of predictor values in SPS (e.g. sps_num_palette_predictor_initializer_minus1) and the number of predictor values in PPS (e.g. pps_num_palette_predictor_initializer_minus1) are disclosed in this application. For example, in the bitstream conformance, it can be required that the number of predictor values in SPS (i.e., sps_num_palette_predictor_initializer_minus1) should be equal to the number of predictor values in PPS (i.e., pps_num_palette_predictor_initializer_minus1). In another example, the number of predictor values in PPS (i.e., pps_num_palette_predictor_initializer_minus1) and the number of predictor values in SPS (i.e., sps_num_palette_predictor_initializer_minus1) can be different and independently.

Palette Predictor Initialization Example 1.

Palette prediction initialization based on palette predictor information at SPS and PPS is disclosed as follows.

Case a)

SPS predictor flag, sps_palette_predictor_initializer_present_flag equal to 1. In this case, the palette predictor is initialized using the SPS palette predictor initializer first:

The palette predictor size (i.e., PredictorPaletteSize) is set to be equal to sps_num_palette_predictor_initializer_minus1 plus 1.

The palette predictor (i.e., PredictorPaletteEntries) is set to be equal to sps_palette_predictor_initializers according to:

for(i=0; i<PredictorPaletteSize; i++)
  for(comp=0; comp<3; comp++)

PredictorPaletteEntries[i][comp]=sps_palette_predictor_initializers[i][comp].

Case b)

SPS predictor flag, sps_palette_predictor_initializer_present_flag equal to 0. In this case, the palette predictor size is set to be equal to 0 and the palette predictor is set to 0. In Case b), the palette predictor information in PPS is further checked.

Case b.1)

PPS predictor flag, pps_palette_predictor_initializer_present_flag equal to 1. In this case, (i) If pps_num_palette_predictor_initializer_minus1 is greater than or equal to sps_num_palette_predictor_initializer_minus1, the palette predictor is initialized as follows:

The palette predictor size is set to be equal to pps_num_palette_predictor_initializer_minus1 plus 1.

The palette predictor (i.e., PredictorPaletteEntries) is set to be equal to pps_palette_predictor_initializers according to:

for(i=0; i<PredictorPaletteSize; i++)
  for(comp=0; comp<3; comp++)
    PredictorPaletteEntries[i][comp]=pps_palette_predictor_initializers[i][comp].

(ii) If pps_num_palette_predictor_initializer_minus1 is less than sps_num_palette_predictor_initializer_minus1, the palette predictor is initialized as follows:

The palette predictor size is set to be equal to sps_num_palette_predictor_initializer_minus1 plus 1.

The palette predictor (PredictorPaletteEntries) is derived using pps_palette_predictor_initializers and sps_palette_predictor_initializers.

In case (ii), there are many different ways to perform palette predictor initialization based on palette predictor information in SPS and PPS. Four examples are shown below.

Example 1

The entries from 0-th index through the (pps_num_palette_predictor_initializer_minus1)-th index of the palette predictor are initialized using pps_palette_predictor_initializers. For the entries from the (pps_num_palette_predictor_initializer_minus1 plus 1)-th index through the (sps_num_palette_predictor_initializer_minus1)-th index of the palette predictor are initialized using those SPS palette predictor at the front of sps_palette_predictor_initializers[ ][ ].

An exemplary process incorporating the above embodiment is shown as follows:

1) for(i=0; i<pps_num_palette_predictor_initializer_minus1+1; i++)
    for(comp=0; comp<3; comp++)
      PredictorPaletteEntries[i][comp]=pps_palette_predictor_initializers[i][comp]
2) for(i=pps_num_palette_predictor_initializer_minus1+1; i<sps_num_palette_predictor_initializer_minus1+1; i++)
    for(comp=0; comp<3; comp++)
      PredictorPaletteEntries[i][comp]=sps_palette_predictor_initializers [i−pps_num_palette_predictor_initializer_minus1−1][comp]

In the above exemplary process, the palette prediction initialization comprises two parts. The first part corresponds to the entries from 0-th index through the index corresponding to pps_num_palette_predictor_initializer_minus1 of the palette predictor are initialized. The second part is associated with entries from the index corresponding to pps_num_palette_predictor_initializer_minus1 plus 1 through the index corresponding to sps_num_palette_predictor_initializer_minus1 of the palette predictor.

Example 2

The entries from 0-th index through the (pps_num_palette_predictor_initializer_minus1)-th index of the palette predictor are initialized using pps_palette_predictor_initializers. For the entries from the (pps_num_palette_predictor_initializer_minus1 plus 1)-th index through the (sps_num_palette_predictor_initializer_minus1)-th index of the palette predictor are initialized using the SPS palette predictors at the end of sps_palette_predictor_initializers[ ][ ].

Example 3

The entries from 0-th index through the (sps_num_palette_predictor_initializer_minus1−pps_num_palette_predictor_initializer_minus1−1)-th index are initialized by the SPS palette predictor entries at the front of the sps_palette_predictor_initializer[ ][ ]. The entries from the (sps_num_palette_predictor_initializer_minus1−pps_num_palette_predictor_initializer_minus1)-th index through the (sps_num_palette_predictor_initializer_minus1)-th index of the palette predictor are initialized by pps_palette_predictor_initializers[ ][ ].

An exemplary process incorporating the above embodiment is shown as follows, where the two sections of pseudo codes correspond to the two index ranges mentioned above:

1) for(i=0; i<sps_num_palette_predictor_initializer_minus1−pps_num_palette_predictor_initializer_minus1; i++)
    for(comp=0; comp<3; comp++)
      PredictorPaletteEntries[i][comp]=sps_palette_predictor_initializers[i][comp]
2) for(i=sps_num_palette_predictor_initializer_minus1−pps_num_palette_predictor_initializer_minus1; i<sps_num_palette_predictor_initializer_minus1+1; i++)
    for(comp=0; comp<3; comp++)
      PredictorPaletteEntries[i][comp]=pps_palette_predictor_initializers [i−(sps_num_palette_predictor_initializer_minus1−pps_num_palette_predictor_initializer_minus1)][comp]

Example 4

The entries from the 0-th index through the (sps_num_palette_predictor_initializer_minus1−pps_num_palette_predictor_initializer_minus1−1)-th index are initialized by the SPS palette predictors at the end of the sps_palette_predictor_initializers[ ][ ]. The entries from index corresponding to (sps_num_palette_predictor_initializer_minus1−pps_num_palette_predictor_initializer_minus1) through the index corresponding to the sps_num_palette_predictor_initializer_minus1 of the palette predictors are initialized by pps_palette_predictor_initializers[ ][ ].

Case b.2)

PPS predictor flag, pps_palette_predictor_initializer_present_flag equal to 0. In this case, the palette predictor size (i.e., PredictorPaletteSize) is inferred to be equal to PredictorPaletteSize specified by the active SPS, and the palette predictor entries (i.e., PredictorPaletteEntries) are inferred to be equal to PredictorPaletteEntries specified by the active SPS.

In another variation of palette predictor size setting, the palette predictor size can be set to be equal to (pps_num_palette_predictor_initializer_minus1+sps_num_palette_predictor_initializer_minus1+2). In this case, the palette predictor is initialized by the PPS palette predictor_initializers and SPS palette predictor_initializers.

Example 1

The entries from 0-th index through the (pps_num_palette_predictor_initializer_minus1)-th index of the palette predictor will be initialized by PPS palette initializer. The entries from the (pps_num_palette_predictor_initializer_minus1+1)-th index through the (pps_num_palette_predictor_initializer_minus1+1+sps_num_palette_predictor_initializer_minus1)-th index of the palette predictor will be initialized by SPS palette initializers.

Example 2

The entries from the 0-th index through the (sps_num_palette_predictor_initializer_minus1)-th index will be initialized by the SPS palette initializers. The entries from (sps_num_palette_predictor_initializer_minus1+1)-th index through the (pps_num_palette_predictor_initializer_minus1+1+sps_num_palette_predictor_initializer_minus1)-th index of the palette predictor will be initialized by the SPS palette initializers.

In yet another variation of palette predictor size setting, the palette predictor size is always equal to PaletteMaxPredictorSize. In this case, the palette predictor is initialized by the PPS palette predictor_initializers and SPS palette predictor_initializers.

Case 1).

(pps_num_palette_predictor_initializer_minus1+sps_num_palette_predictor_initializer_minus1) smaller than PaletteMaxPredictorSize. In this case, the entries from 0-th index through the (pps_num_palette_predictor_initializer_minus1)-th index will be initialized by PPS palette initializer. The entries from the (pps_num_palette_predictor_initializer_minus1+1)-th index through (pps_num_palette_predictor_initializer_minus1+1+sps_num_palette_predictor_initializer_minus1)-th index of the palette predictor will be initialized by the SPS palette initializers. The rest entries of the palette predictor will be initialized as 0.

Case 2).

(pps_num_palette_predictor_initializer_minus1+sps_num_palette_predictor_initializer_minus1) greater than PaletteMaxPredictorSize. In this case, the entries from the 0-th index through the (pps_num_palette_predictor_initializer_minus1)-th index will be initialized by the PPS palette initializers. The rest entries in the palette predictor will be initialized by the SPS palette initializers.

In yet another variation of palette predictor size setting, the size of SPS palette predictor_initializers (i.e., sps_num_palette_predictor_initializer_minus1 plus 1), the size of PPS palette predictor_initializers (i.e., pps_num_palette_predictor_initializer_minus1plus 1), or both can always be equal to PaletteMaxPredictorSize. Therefore, one or both pps_num_palette_predictor_initializer_minus1 and sps_num_palette_predictor_initializer_minus1 do not need to be signaled.

Palette Predictor Initialization in the Slice Header

In this embodiment, a flag "slice_palette_predictor_initializer_present_flag" in slice header is signaled to specify whether there is a set of signaled palette predictor values for the current slice.

If the flag "slice_palette_predictor_initializer_present_flag" is equal to 1, a set of slice header parameters (e.g. slice_luma_bit_depth_entry_minus8, slice_chroma_bit_depth_entry_minus8 and slice_num_palette_predictor_initializer_minus1) are signaled, followed by a set of initial palette predictor values "slice_palette_predictor_initializers[ ][ ]".

The flag "slice_palette_predictor_initializer_present_flag" equal to 1 specifies that parameters are present in the slice header to modify the palette predictor specified in the active PPS. The flag "slice_palette_predictor_initializer_present_flag" equal to 0 specifies that the palette predictor used for the current slice is inferred to be equal to those specified in the active PPS. When palette_mode_enabled_flag is equal to 0, the value of the flag "slice_palette_predictor_initializer_present_flag" shall be equal to 0. When palette_mode_enabled_flag is equal to 1, "sps_palette_predictor_initializer_present_flag" is equal to 0, "pps_palette_predictor_initializer_present_flag" is equal to 0, and "slice_palette_predictor_initializer_present_flag" is equal to 0, the default palette predictor values are used.

In one variant, the slice level "slice_palette_predictor_initializer_present_flag" is only signaled when "palette_mode_enabled_flag" is equal to 1. In other words, only when palette mode is allowed for the current sequence, picture or slice, this slice level predictor flag will be signaled. If "palette_mode_enabled_flag" is equal to 0, this slice flag is not signaled. In this case, this slice level predictor flag is inferred to be equal to 0.

Figure 1:
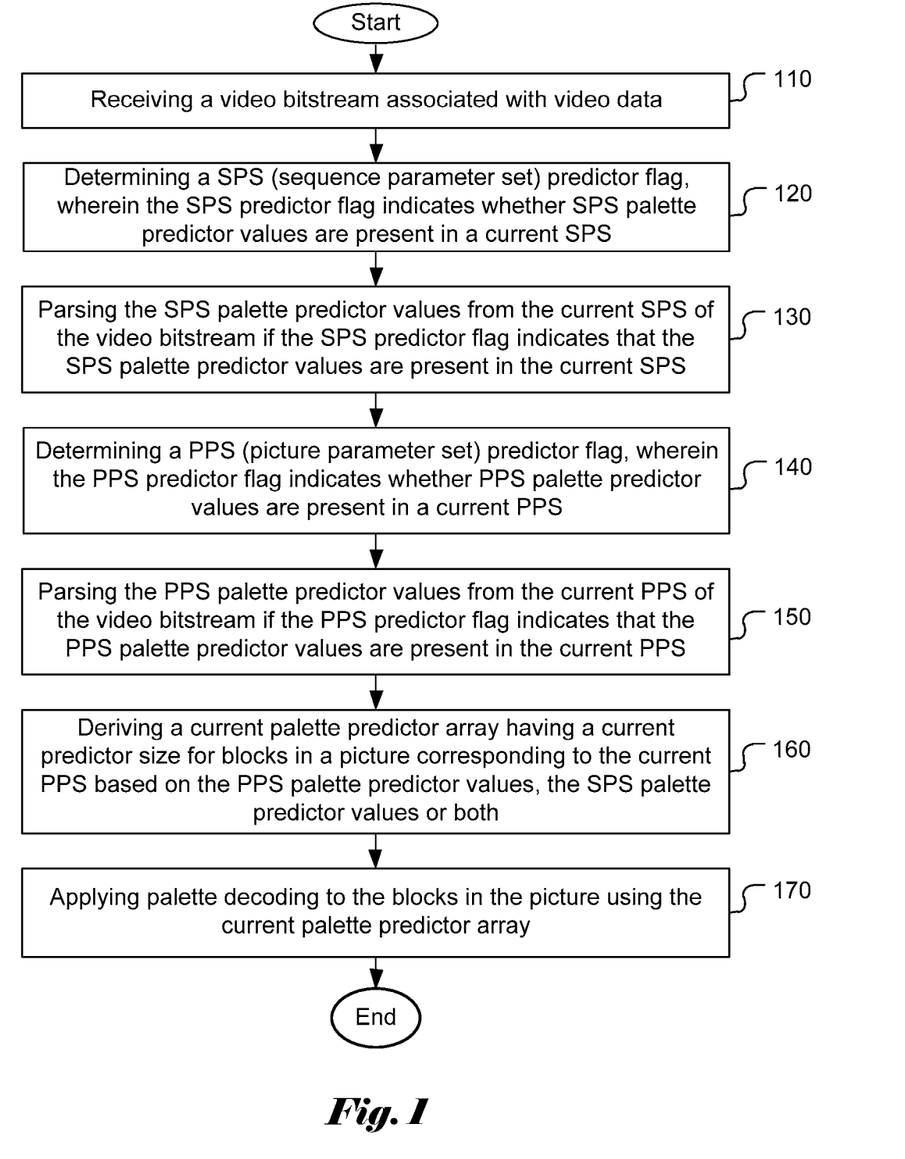
FIG. 1 illustrates an exemplary flowchart of a video decoder for palette coding incorporating an embodiment of the present invention.

FIG. 1 illustrates an exemplary flowchart of a video decoder for palette coding incorporating an embodiment of the present invention. The system receives a video bitstream including compressed data of blocks in a picture as shown in step 110. A SPS (sequence parameter set) predictor flag, indicating whether SPS palette predictor values are present in a current SPS is determined in step 120. The SPS palette predictor values are parsed from the current SPS of the video bitstream if the SPS predictor flag indicates that the SPS palette predictor values are present in the current SPS in step 130. A PPS (picture parameter set) predictor flag indicating whether PPS palette predictor values are present in a current PPS is determined in step 140. The PPS palette predictor values are parsed from the current PPS of the video bitstream if the PPS predictor flag indicates that the PPS palette predictor values are present in the current PPS in step 150. A current palette predictor array having a current predictor size for blocks in a picture corresponding to the current PPS is derived based on the PPS palette predictor values, the SPS palette predictor values or both in step 160. Palette decoding is then applied to the blocks in the picture using the current palette predictor array in step 170.

Figure 2:
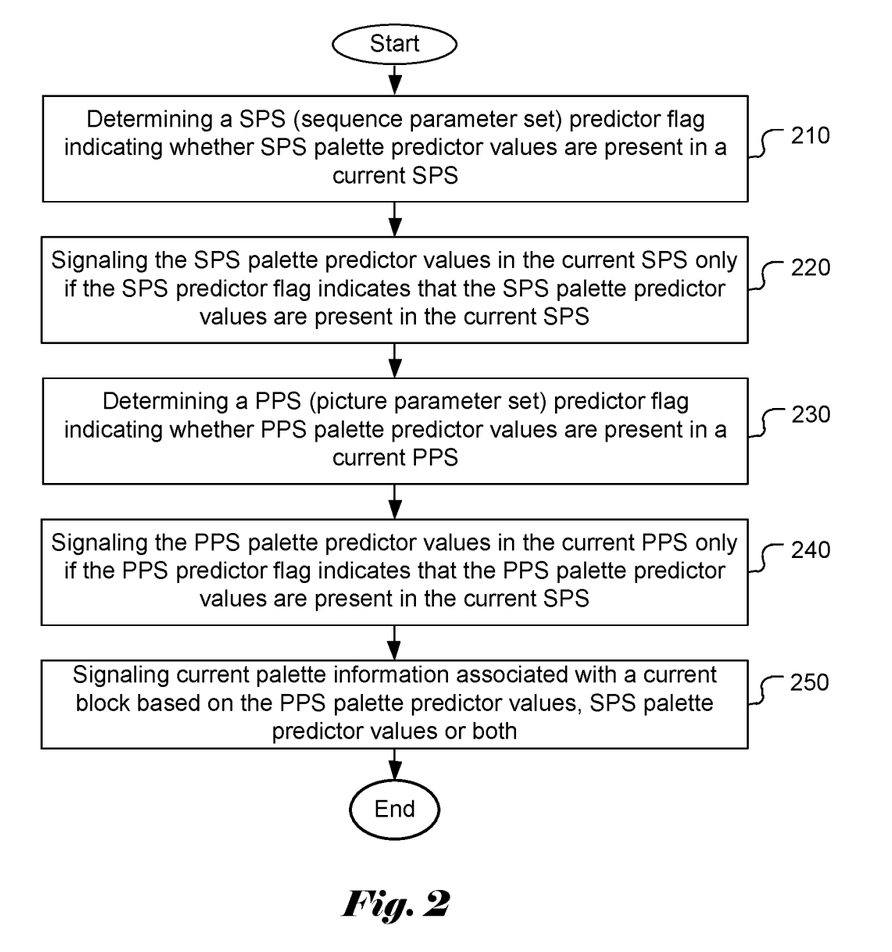
FIG. 2 illustrates an exemplary flowchart of a video encoder for palette coding incorporating an embodiment of the present invention.

FIG. 2 illustrates an exemplary flowchart of a video encoder for palette coding incorporating an embodiment of the present invention. A SPS (sequence parameter set) predictor flag indicating whether SPS palette predictor values are present in current SPS is determined in step 210. The SPS palette predictor values is signaled in the current SPS only if the SPS predictor flag indicates that the SPS palette predictor values are present in the current SPS in step 220. A PPS (picture parameter set) predictor flag indicating whether PPS palette predictor values are present in a current PPS is determined in step 230. The PPS palette predictor values are signaled in the current PPS only if the PPS predictor flag indicates that the PPS palette predictor values are present in the current SPS in step 240. The current palette information associated with a current block is signaled based on the PPS palette predictor values, SPS palette predictor values or both in step 250.

The flowcharts shown are intended to illustrate an example of palette coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of decoding video data coded in palette coding for a video decoding system, comprising:

receiving a video bitstream associated with the video data;

determining a sequence parameter set (SPS) predictor flag, wherein the SPS predictor flag indicates whether SPS palette predictor values are present in a current SPS;

if the SPS predictor flag indicates that the SPS palette predictor values are present in the current SPS, parsing the SPS palette predictor values from the current SPS of the video bitstream at least by setting a Predictor Palette Size variable to a SPS Num Palette Predictor Initializer and deriving array Predictor Palette Entries based on the SPS Num Palette Predictor Initializer;

determining a picture parameter set (PPS) predictor flag, wherein the PPS predictor flag indicates whether PPS palette predictor values are present in a current PPS;

if the PPS predictor flag indicates that the PPS palette predictor values are present in the current PPS, parsing the PPS palette predictor values from the current PPS of the video bitstream at least by setting the Predictor Palette Size variable to a PPS Num Palette Predictor Initializer and deriving the array Predictor Palette Entries based on the PPS Num Palette Predictor Initializer;

deriving a current palette predictor array including the array Predictor Palette Entries having a current predictor size including the Predictor Palette Size variable for blocks in a picture corresponding to the current PPS based on (i) the PPS palette predictor values when pps_palette_predictor_initializer_present_flag is equal to 1, and (ii) the SPS palette predictor values when the pps_palette_predictor_initializer_present_flag is equal to 0 and sps_palette_predictor_initializer_present_flag is equal to 1;

applying palette decoding to the blocks in the picture using the current palette predictor array; and decoding the video data for the video coding system, wherein, when the pps_palette_predictor_initializer_present_flag is equal to 1, the Predictor Palette Size is equal to pps_num_palette_predictor_initializer, and deriving the array Predictor Palette Entries based on the PPS Num Palette Predictor Initializer includes deriving the array Predictor Palette Entries based on the PPS Num Palette Predictor Initializer according to:

for(comp=0; comp<numComps; comp++)

for(i=0; i<PredictorPaletteSize; i++)

PredictorPaletteEntries[comp][i]=pps_palette_predictor_initializers[comp][i];

wherein, when the pps_palette_predictor_initializer_present_flag is equal to 0 and the sps_palette_predictor_initializer_present_flag is equal to 1, the Predictor Palette Size is equal to sps_num_palette_predictor_initializer_minus1 plus 1, and deriving the array Predictor Palette Entries based on the SPS Num Palette Predictor Initializer includes deriving the array Predictor Palette Entries based on the SPS Num Palette Predictor Initializer according to:

for(comp=0; comp<numComps; comp++)

for(i=0; i<PredictorPaletteSize; i++)

PredictorPaletteEntries[comp][i]=sps_palette_predictor_initializers[comp][i];

wherein, when the pps_palette_predictor_initializer_present_flag is equal to 0 and the sps_palette_predictor_initializer_present_flag is equal to 0, the Predictor Palette Size is equal to 0; and wherein numComps=(ChromaArrayType==0)?1:3.

2. The method of claim 1, further comprising parsing a first-total-predictor-number and parsing the first-total-predictor-number of the SPS palette predictor values from the current SPS according to the SPS predictor flag; and parsing a second-total-predictor-number and parsing the second-total-predictor-number of the PPS palette predictor values from the current PPS according to the PPS predictor flag.

3. The method of claim 2, wherein if the PPS predictor flag indicates that the PPS palette predictor values are present in the current PPS, the current predictor size is set to the second-total-predictor-number and entries of the current palette predictor array are copied from the PPS palette predictor values.

4. The method of claim 2, wherein if the PPS predictor flag indicates that the PPS palette predictor values are not present in the current PPS and the SPS predictor flag indicates that the SPS palette predictor values are present in the current SPS, the current predictor size is set to the first-total-predictor-number and entries of the current palette predictor array are copied from the SPS palette predictor values.

5. The method of claim 2, wherein if the PPS predictor flag indicates that the PPS palette predictor values are not present in the current PPS and the SPS predictor flag indicates that the SPS palette predictor values are not present in the current SPS, the current predictor size is set to 0 and entries of the current palette predictor array are set to 0 or another default value.

6. The method of claim 2, wherein if the PPS predictor flag indicates that the PPS palette predictor values are present in the current PPS and the SPS predictor flag indicates that the SPS palette predictor values are present in the current SPS, the current predictor size is set to the first-total-predictor-number, beginning second-total-predictor-number entries of the current palette predictor array are copied from the PPS palette predictor values, and remaining (N-M) entries of the current palette predictor array are copied from the SPS palette predictor values, wherein N represents the first-total-predictor-number and NI represents the second-total-predictor-number.

7. The method of claim 2, wherein if the PPS predictor flag indicates that the PPS palette predictor values are present in the current PPS and the SPS predictor flag indicates that the SPS palette predictor values are present in the current SPS, the current predictor size is set to a sum of the first-total-predictor-number and the second-total-predictor-number.

8. The method of claim 7, wherein if the sum of the first-total-predictor-number and the second-total-predictor-number is greater than a maximum allowed palette predictor size, the current predictor size is set to the maximum allowed palette predictor size.

9. The method of claim 1, wherein if the PPS predictor flag indicates that the PPS palette predictor values are not present in the current PPS and the SPS predictor flag indicates that the SPS palette predictor values are not present in the current SPS, the current predictor size is set to 0 and entries of the current palette predictor array are set to a default value.

10. The method of claim 9, wherein the default value is zero or half of a maximum pixel value.

11. The method of claim 1, wherein the SPS predictor flag is parsed from the current SPS of the video bitstream, and if the SPS predictor flag is not present in the video bitstream, the SPS predictor flag is inferred to indicate that the SPS palette predictor values are not present in the current SPS.

12. The method of claim 1, wherein the PPS predictor flag is parsed from the current PPS of the video bitstream, and if the PPS predictor flag is not present in the video bitstream, the PPS predictor flag is inferred to indicate that the PPS palette predictor values are not present in the current PPS.

13. The method of claim 1, further comprising determining a slice predictor flag, wherein the slice predictor flag indicates whether slice palette predictor values are present in a current slice.

14. The method of claim 1, further comprising determining a tile predictor flag, wherein the tile predictor flag indicates whether tile palette predictor values are present in a current tile.

15. The method of claim 14, further comprises parsing a third-total-predictor-number and parsing the third-total-predictor-number of the tile palette predictor values in the current tile from the video bitstream if the tile predictor flag indicates that the tile palette predictor values are present in the current tile.

16. An apparatus of decoding video data coded in palette coding for a video decoding system, comprising:
a processor configured to:
  receive a video bitstream associated with video data;
  determine a sequence parameter set (SPS) predictor flag, wherein the SPS predictor flag indicates whether SPS palette predictor values are present in a current SPS;
  if the SPS predictor flag indicates that the SPS palette predictor values are present in the current SPS, parse the SPS palette predictor values from the current SPS of the video bitstream at least by setting a Predictor Palette Size variable to a SPS Num Palette Predictor Initializer and deriving array Predictor Palette Entries based on the SPS Num Palette Predictor Initializer:
  determine a picture parameter set (PPS) predictor flag, wherein the PPS predictor flag indicates whether PPS palette predictor values are present in a current PPS;
  if the PPS predictor flag indicates that the PPS palette predictor values are present in the current PPS, parse the PPS palette predictor values from the current PPS of the video bitstream at least by setting the Predictor Palette Size variable to a PPS Num Palette Predictor Initializer and deriving the array Predictor Palette Entries based on the PPS Num Palette Predictor Initializer;
  derive a current palette predictor array including the array Predictor Palette Entries having a current predictor size including the Predictor Palette Size variable for blocks in a picture corresponding to the current PPS based on (i) the PPS palette predictor values when pps_palette_predictor_initializer_present_flag is equal to 1, and (ii) the SPS palette predictor values when the pps_palette_predictor_initializer_present_flag is equal to 0 and sps_palette_predictor_initializer_present_flag is equal to 1;
  apply palette decoding to the blocks in the picture using the current palette predictor array; and
  decode the video data for the video coding system,
wherein, when the pps_palette_predictor_initializer_present_flag is equal to 1, the Predictor Palette Size is equal to pps_num_palette_predictor_initializer, and when deriving the array Predictor Palette Entries based on the PPS Num Palette Predictor Initializer, the processor is further configured to derive the array Predictor Palette Entries based on the PPS Num Palette Predictor Initializer according to:
for(comp=0; comp<numComps; comp++)
  for(i=0; i<PredictorPaletteSize; i++)
    PredictorPaletteEntries[comp][i]=pps_palette_predictor_initializers[comp][i];
wherein, when the pps_palette_predictor_initializer_present_flag is equal to 0 and the sps_palette_predictor_initializer_present_flag is equal to 1, the Predictor Palette Size is equal to sps_num_palette_predictor_initializer_minus1 plus 1, and when deriving the array Predictor Palette Entries based on the SPS Num Palette Predictor Initializer, the processor is further configured to derive the array Predictor Palette Entries based on the SPS Num Palette Predictor Initializer according to:
for(comp=0; comp<numComps; comp++)
  for(i=0; i<PredictorPaletteSize; i++)
    PredictorPaletteEntries[comp][i]=sps_palette_predictor_initializers[comp][i];
wherein, when the pps_palette_predictor_initializer_present_flag is equal to 0 and the sps_palette_predictor_initializer_present_flag is equal to 0, the Predictor Palette Size is equal to 0; and
wherein numComps=(ChromaArrayType==0)?1:3.

* * * * *